US012808893B2

(12) United States Patent
Zuo et al.

(10) Patent No.: US 12,808,893 B2
(45) Date of Patent: Nov. 24, 2026

(54) CONVEYING DEVICE, SAMPLE RACK MANIPULATION APPARATUS AND AUTOMATIC TEST SYSTEM

(71) Applicant: BECKMAN COULTER, INC., Wilmington, DE (US)

(72) Inventors: Lidang Zuo, Suzhou (CN); Danming Yang, Suzhou (CN)

(73) Assignee: BECKMAN COULTER, INC., Brea, CA (US)

( * ) Notice: Subject to any disclaimer, the term of this patent is extended or adjusted under 35 U.S.C. 154(b) by 569 days.

(21) Appl. No.: 18/274,774

(22) PCT Filed: Jan. 28, 2021

(86) PCT No.: PCT/CN2021/074069

§ 371 (c)(1),
(2) Date: Jul. 28, 2023

(87) PCT Pub. No.: WO2022/160151

PCT Pub. Date: Aug. 4, 2022

(65) Prior Publication Data

US 2024/0094235 A1 Mar. 21, 2024

(51) Int. Cl.
*G01N 35/04* (2006.01)

(52) U.S. Cl.
CPC ..... *G01N 35/04* (2013.01); *G01N 2035/0412* (2013.01)

(58) Field of Classification Search
CPC . G01N 2035/00801; G01N 2035/0412; G01N 2035/0415; G01N 2035/0465; G01N 35/00732; G01N 35/04
See application file for complete search history.

(56) References Cited

U.S. PATENT DOCUMENTS

| | | | |
|---|---|---|---|
| 4,609,017 | A | 9/1986 | Coulter et al. |
| 9,656,266 | B2 | 5/2017 | Luoma, II et al. |
| 10,803,266 | B2 | 10/2020 | Wolf et al. |

FOREIGN PATENT DOCUMENTS

| | | | |
|---|---|---|---|
| CN | 105383894 | A | 3/2016 |
| CN | 107300624 | A | 10/2017 |

(Continued)

OTHER PUBLICATIONS

Supplementary European Search Report for EP 21921771.8 dated Sep. 26, 2024, pages.

(Continued)

*Primary Examiner* — Jennifer Wecker
*Assistant Examiner* — Jonathan Bortoli
(74) *Attorney, Agent, or Firm* — FBT Gibbons LLP

(57) ABSTRACT

A conveying device (100) for a sample rack manipulation apparatus (10). The conveying device (100) is suitable for conveying, between a loading/unloading area (TA), a sampling area (TD) and a buffer area (TC) of the sample rack manipulation apparatus (10), a sample rack (30) containing sample containers (20); the conveying device (100) is provided with an identifier code reading device, the identifier code reading device being suitable for reading an identifier code of the sample rack (30) and identifier codes of the sample containers (20) on the sample rack (30) when the sample rack (30) is loaded from the loading/unloading area (TA) to the conveying device (100). The present disclosure further relates to a sample rack manipulation apparatus (10) comprising the conveying device (100) and an automatic detection system (1) comprising the sample rack manipulation apparatus (10).

17 Claims, 5 Drawing Sheets

(56) References Cited

FOREIGN PATENT DOCUMENTS

| | | | |
|---|---|---|---|
| CN | 110658348 | A | 1/2020 |
| CN | 112198331 | A | 1/2021 |
| CN | 112415212 | A | 2/2021 |
| CN | 112415214 | A | 2/2021 |
| EP | 0979999 | B1 | 2/2000 |
| EP | 0902290 | B1 | 11/2008 |
| EP | 2746774 | A1 | 6/2014 |
| JP | 2007309743 | A | 11/2007 |
| WO | WO 2008/028009 | A2 | 3/2008 |
| WO | 2017/143182 | A2 | 8/2017 |
| WO | WO 2022/160151 | A1 | 8/2022 |

OTHER PUBLICATIONS

International Search Report and Written Opinion for PCT/CN2021/074069 mailed Nov. 4, 2021, 6 pages.

European Office Action for Application No. EP 21921771.8, mailed Jun. 19, 2026, 9 pages.

CONVEYING DEVICE, SAMPLE RACK MANIPULATION APPARATUS AND AUTOMATIC TEST SYSTEM

PRIORITY

This application is a § 371 national stage entry of International Pat. App. No. PCT/CN2021/074069, entitled "Conveying Device, Sample Rack Manipulation Apparatus and Automatic Test System," filed on Jan. 28, 2021, and published as WO 2022/160151 on Aug. 4, 2022, the disclosure of which is incorporated by reference herein.

FIELD

The present application relates to the field of medical technology, and in particular to a shuttle, a sample rack manipulation apparatus including the shuttle, and an automatic testing system including the sample rack manipulation apparatus.

BACKGROUND

The contents of this section only provide background information related to the present application, which may not necessarily be the prior art.

An automatic testing system (which may also be referred to as an analytical test instrument) is typically used to analyze the contents in a sample container for various purposes. The analytical test instrument typically includes a sample rack manipulation portion, a sampling portion, and a testing portion. The sample rack manipulation portion is configured to convey the sample container to the sampling portion, and the sampling portion is configured to transfer the sample in the sample container to the testing portion for testing of the sample.

A sample rack is configured to receive, support, align, hold and/or carry one or more sample containers to ensure that the sample containers are positioned and/or conveyed within the analytical test instrument. A sample rack manipulation apparatus (the sample rack manipulation portion) is configured to load, convey and/or unload one or more sample racks. To distinguish between the sample containers as well as the sample rack, identification codes are attached on the sample rack and the sample containers.

A sample rack manipulation apparatus is known. The sample rack manipulation apparatus includes two code readers fixed to a rack. One of the code readers is configured to read identification code of a sample rack, and the other of the code readers is configured to read identification code on a sample container. As a result, the sample rack manipulation apparatus has a high cost. In addition, the sample rack needs to be conveyed to the code reader each time to read the identification code of the sample rack, thereby increasing the time and space required to convey the sample rack.

Another conventional sample rack manipulation apparatus is known. The sample rack manipulation apparatus includes a code reader and a rotatable mirror. After the code reader reads identification code of a sample rack, the mirror needs to be rotated to a special position to enable identification code on a sample container to be read. Similarly, after the identification code on the sample container is read, the mirror needs to be rotated back to enable identification code of a next sample container to be read. Therefore, in the sample rack manipulation apparatus, a component for driving the rotation of the mirror during operation is added, thereby increasing the costs.

In view of this, it is desirable in the art to provide a sample rack manipulation apparatus, with which occupied space and operating time can be saved and/or the costs can be reduced.

SUMMARY

This section provides a general overview of the present application and is not a comprehensive disclosure of the full scope of the present application or all of its features.

According to an aspect of the present application, a shuttle for a sample rack manipulation apparatus is provided. The shuttle is configured to convey a sample rack containing a sample container between a loading/unloading area, a sampling area and a buffer area of the sample rack manipulation apparatus. The shuttle is provided with an identification code reading device, where the identification code reading device is configured to read identification code of the sample rack and/or identification code of the sample container on the sample rack when the sample rack is loaded from the loading/unloading area onto the shuttle.

The shuttle according to the present application is integrated with the identification code reading device. In this way, as the sample rack is loaded onto the shuttle from the loading/unloading area, the identification code reading device can sequentially read the identification code of the sample rack and the identification code of the sample container on the sample rack. Therefore, the conveying time and space required to convey the sample rack to a code reader fixed to a rack of an automatic testing system for reading the sample rack can be saved.

In some embodiments, the identification code reading device is an optical reading device. The optical reading device allows for a more flexible design and lower costs of the shuttle.

In some embodiments, the optical reading device includes at least one code reader and at least one mirror, and the code reader is configured to read the identification code of the sample rack and/or the identification code of the sample container by reflection of the mirror on the identification code of the sample rack and/or the identification code of the sample container. In the shuttle according to the present application, both the identification code of the sample rack and the identification code of the sample container can be read by one code reader. Therefore, with the shuttle according to the present application, costs can be significantly reduced.

In some embodiments, the mirror is fixedly mounted to a fixed structure of the shuttle. In the shuttle according to the present application, it is not necessary to rotate the mirror to enable the identification code of the sample rack and the identification code of the sample container to be read. Therefore, the shuttle according to the present application does not necessarily include a part for driving the rotation of the mirror, thereby simplifying the structure and reducing the costs.

In some embodiments, the mirror is adjustably mounted to a fixed structure of the shuttle through a mirror support member. In some embodiment, the code reader is adjustably mounted to a fixed structure of the shuttle through a code reader support member. Adjustably mounting the mirror and/or the code reader may be suitable for reading the identification codes on different sample racks or different sample containers.

In some embodiments, the mirror is arranged at one end of the shuttle. In some embodiments, the one end of the shuttle is adjacent to the loading/unloading area, which facilitates that the identification code reading device can start reading the identification code of the sample rack immediately after the sample holder is loaded onto the shuttle, and that the identification code reading device has just finished reading the identification code of a last sample container when the sample rack is loaded in place on the shuttle. In this way, the whole process of reading the identification code by the identification code reading device is optimized.

In some embodiments, the shuttle includes a sample rack loading portion for carrying the sample rack and a code reading portion for carrying the identification code reading device, and the code reading portion and the sample rack loading portion are arranged horizontally adjacent to each other.

In some embodiments, the sample rack loading portion has a longitudinal direction substantially in line with a longitudinal direction of the sample rack loaded on the sample rack loading portion, where multiple sample containers are arranged along the longitudinal direction of the sample rack. The optical reading device includes a first optical path from the identification code of the sample rack and/or the identification code of the sample container to the mirror and a second optical path from the mirror to the code reader, where the second optical path is substantially parallel to the longitudinal direction of the sample rack loading portion. This allows for a more compact structure of the shuttle.

In some embodiments, the shuttle includes two code reading portions respectively located on two opposite sides of the sample rack loading portion, and each of the two code reading portions is provided with the identification code reading device. In this way, the accuracy of the reading can be determined and improved by comparing reading results of the two identification code reading devices. Alternatively, one of the identification code reading devices may be used as a back-up device, for example, the identification code reading device may be activated in the event of a failure of the other identification code reading device.

In some embodiments, the identification code reading device is configured to sequentially read the identification code of the sample rack and the identification code of the sample container on the sample rack when the sample rack is loaded stepwise or continuously.

According to another aspect of the present application, a sample rack manipulation apparatus is provided. The sample rack manipulation apparatus includes the foregoing shuttle.

In some embodiments, the sample rack manipulation apparatus includes a sample rack for holding sample containers, the sample rack is provided with multiple accommodating portions for accommodating multiple sample containers, and the multiple accommodating portions are arranged at equal interval in a longitudinal direction.

In some embodiments, each of the accommodating portions is provided with a notch for exposing the identification code of a sample container, and the notch faces the identification code reading device.

According to yet another aspect of the present application, an automatic testing system is provided. The automatic testing system includes the foregoing sample rack manipulation apparatus.

The foregoing and other objects, features and advantages of the present application will be more fully understood in combination with the detailed description given hereinafter and the accompanying drawings, which are given by way of illustration only and are not therefore considered as limitation to the present application.

BRIEF DESCRIPTION OF THE DRAWINGS

The accompanying drawings described herein are only used for illustrating the selected embodiments rather than all possible embodiments, and are not intended to limit the scope of the present application.

Corresponding reference numerals indicate corresponding components throughout several views of the accompanying drawings.

DETAILED DESCRIPTION OF THE EMBODIMENTS

Exemplary embodiments according to the present application will now be more fully described with reference to the accompanying drawings.

Exemplary embodiments are provided such that the present application will be thorough, and will fully convey the scope of the present application to those skilled in the art. Examples of many specific details such as specific components, devices and methods are described to provide a thorough understanding of embodiments of the present application. It is apparent to those skilled in the art that, the exemplary embodiments may be implemented in many different forms without specific details, and should not be construed as limitation to the scope of the present application. In some exemplary embodiments, the well-known methods, well-known device structures, and well-known techniques will not be described in detail.

Overview of an Automatic Testing System

Figure 1:
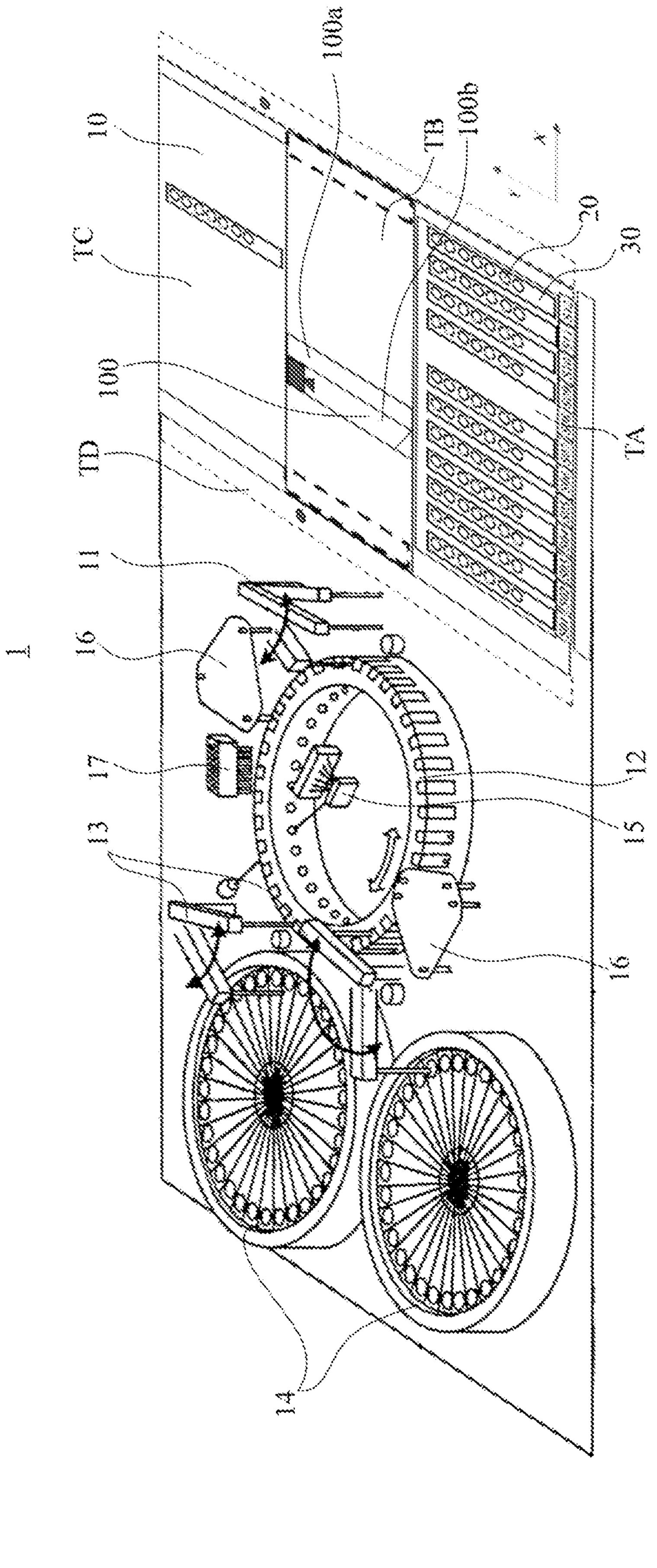
FIG. 1 is a schematic view of the main structure of an automatic testing system.

The main structure and working principle of an automatic testing system 1 will be described hereinafter with reference to FIG. 1. FIG. 1 is a schematic view showing the main structure of the automatic testing system 1. For the sake of clarity, some components, in particular, a cover, a support structure, a control device, and the like, of the automatic testing system 1 are omitted in FIG. 1. The automatic testing system 1 is configured for automatically performing testing and analysis, for example, clinical chemistry, immunology or genetics, on multiple samples. As shown in FIG. 1, the automatic testing system 1 includes: a sample rack manipulation apparatus 10, a sampler 11, a reaction table 12, a reagent dispenser 13, a reagent storage device 14, an optical analyzing device 15, a stirring device 16, and a cleaning device 17.

In a case that a sample (e.g., a biological fluid) needs to be tested for analysis, a container (test tube) 20 containing the sample is placed on a sample rack 30, as shown in FIG. 1, and the sample rack 30 is then loaded into a loading/unloading area TA of the sample rack manipulation apparatus 10. The sample rack 30 is conveyed from the loading/unloading area TA directly to a sampling area TD or to a sampling area TD via a buffer area TC by a shuttle 100 moving in a transfer area TB. The sample in the container 20 is collected into the reaction table 12 by the sampler 11. The reaction table 12 is rotated to convey the sample to the reagent dispenser 13, and the reagent dispenser 13 dispenses corresponding reagents stored in the reagent storage device 14 into the sample. The stirring device 16 stirs a mixture of sample and the reagent to uniformly mix them to facilitate the reaction. The reaction table 12 is rotated to a testing position, where the reaction product is tested and analyzed by the optical analyzing device 15 to obtain a testing and analysis result. After all the samples on the sample rack 30 are tested and analyzed, the reaction table 12 is cleaned by the cleaning device 17 for a next testing and analysis. After the sample is tested and analyzed, the sample rack manipulation apparatus 10 conveys the tested sample rack 30 to the loading/unloading area TA or finally to the loading/unloading area TA via the buffer area TC. Then the operator may remove the tested sample rack 30 from the loading/unloading area TA.

As can be seen from the above description, the sample rack manipulation apparatus 10 constitutes a sample rack manipulation unit of the automatic testing system 1, and components 11 to 17 shown in FIG. 1 constitute a sample testing unit of the automatic testing system 1. However, it should be understood that the automatic testing system 1 shown in FIG. 1 is for illustrative purposes only and is not intended to limit the present application.

Sample Rack

Referring to FIGS. 1 to 4, the sample rack 30 is configured to receive, support, align and hold one or more sample containers 20 containing samples. The sample containers 20 are arranged in a row on the sample rack 30. The number of sample containers 20 that can be carried on one sample rack 30 is typically six to ten. Seven sample containers, i.e., sample containers 201 to 207, are illustrated in the figures. In the illustrated example, the sample rack 30 is longitudinally elongated and the sample containers 201 to 207 are arranged in a column along the longitudinal direction of the sample rack 30. The number of the sample containers may be determined based on a combination of factors such as the size of the apparatus and the waiting time for a next sample rack to be fed. It will be appreciated that there is no limit to the number in the present application. However, the number of the sample containers 20 actually filled on the sample rack 30 may be determined according to actual situations.

The sample rack 30 may be a sample rack that is universal for commonly used sample containers such as cylindrical test tubes or cups, and the universal sample rack 30 may be purchased from Beckman Coulter, Inc.

As described above, the sample rack 30 carrying the sample containers 20 travels through the various areas TA, TB, TC and TD of the sample rack manipulation apparatus 10 to allow various operations to be performed. To distinguish between the samples in the sample containers 20 and the sample rack 30, each sample rack 30 and each of the sample containers 20 on the sample rack 30 carry a corresponding unique identification code, for example, a barcode or RFID (Radio Frequency Identification, not shown in the figures) tag. The identification code on the sample rack 30 may contain sample rack identification information related to only the sample rack, and the identification code on the sample container 20 may contain sample identification information related to only the sample in the sample container.

Figure 2:
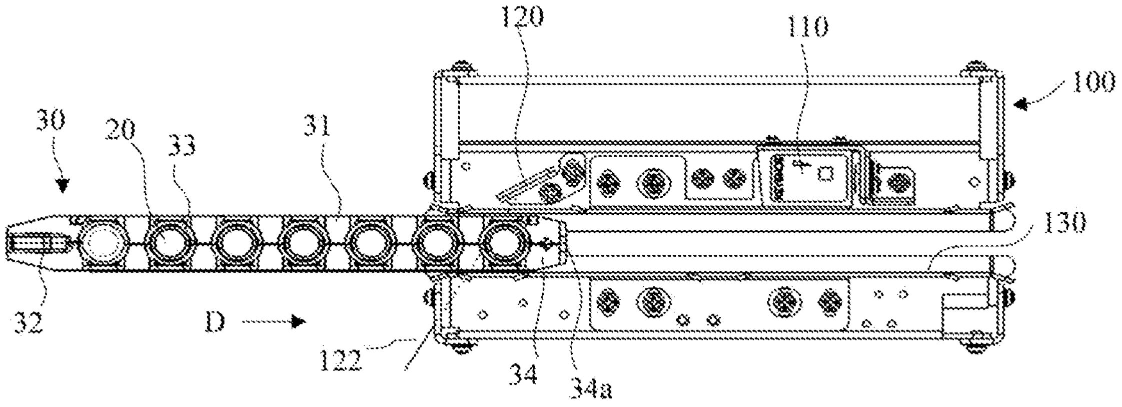
FIG. 2 is a schematic top view of a shuttle according to an embodiment of the present application, in which a code reader on the shuttle is reading identification code on a first sample container.
Figure 3:
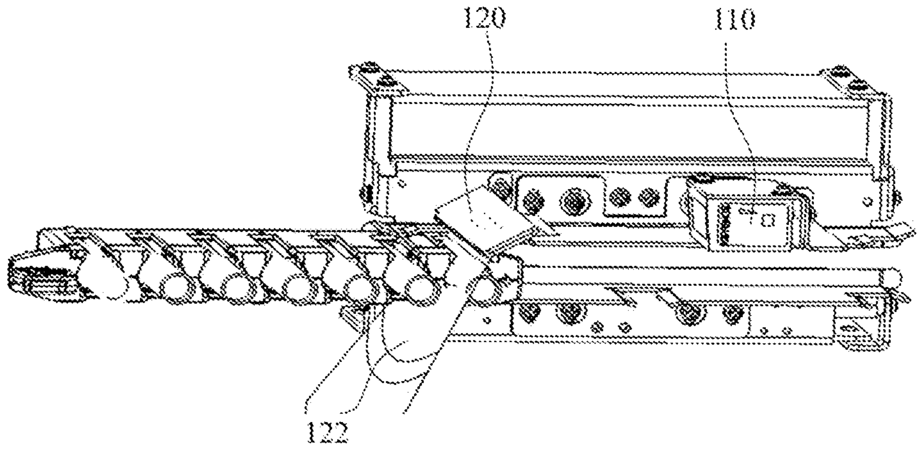
FIG. 3 is a schematic three-dimensional view of the shuttle of FIG. 2.
Figure 4:
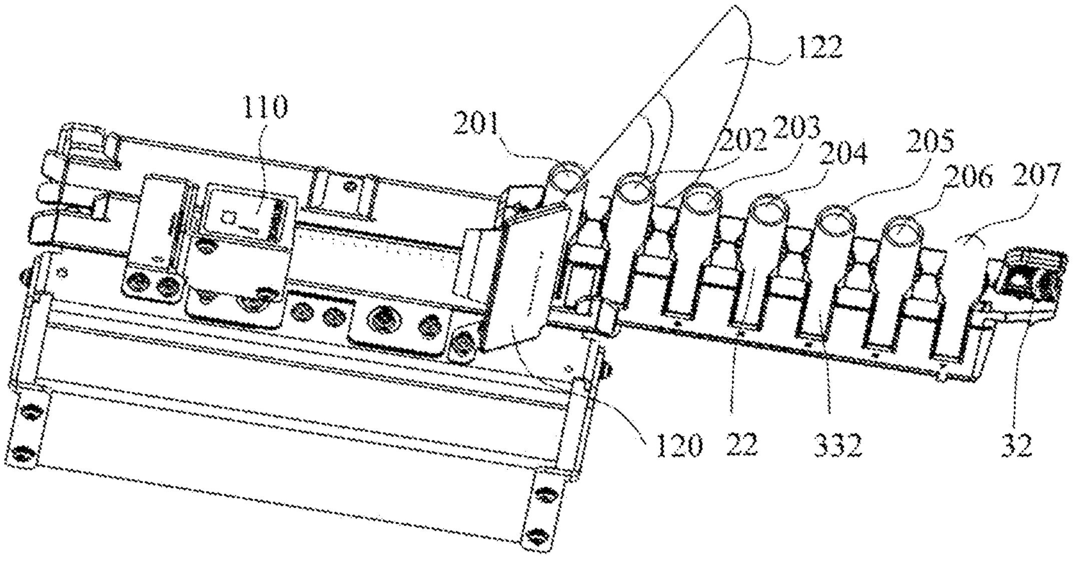
FIG. 4 is another schematic three-dimensional view of the shuttle of FIG. 2.

As shown in FIGS. 2 to 4, the sample rack 30 includes a handle portion 32 for an operator to grasp, a front end portion 34 opposite to the handle portion 32, and a body portion 31 between the handle portion 32 and the front end portion 34. The handle portion 32 is proximate to a door (not shown) of the sample rack manipulation apparatus 10, and the front end portion 34 is proximate to the transfer area TB of the sample rack manipulation apparatus 10. The identification code for the sample rack 30 may be attached on the front end portion 34, for example, on a front end face **34*a* of the front end portion 34**.

The body portion 31 is provided with seven accommodating portions 33 along the longitudinal direction of the sample rack 30 to accommodate the sample containers 201 to 207 respectively (see FIG. 4). The accommodating portions 33 for accommodating the sample container 20 is provided with a notch 332 extending along a height direction of the sample rack 30, to expose the identification code (not shown) on the sample container 20, thereby enabling the identification code reading device to easily read the identification code on the sample container 20.

As shown in FIG. 2, when the shuttle 100 loads the sample rack 30 from the loading/unloading area TA, the sample rack 30 is loaded onto a track 130 of the shuttle 100 in the direction D shown by the arrow in FIG. 2.

The identification code reading device according to the present application is integrated on the shuttle 100 for conveying the sample rack. After the sample rack 30 is loaded onto the shuttle 100 along the direction D, the identification code reading device sequentially reads the sample rack identification code on the front end face of the sample rack 30 and the respective sample identification codes of the sample containers 201 to 207.

Shuttle

As shown in FIG. 1, the shuttle 100 includes a sample rack loading portion **100*a* and a code reading portion (fixed structure) 100*b*. The sample rack loading portion 100*a* is provided with a track 130 for carrying a sample rack 30 (see FIG. 2). The code reading portion 100*b* is arranged side by side with the sample rack loading portion 100*a*, i.e., arranged horizontally adjacent to each other. When a sample rack 30 is loaded on the shuttle 100, the code reading portion 100*b* is located on one side of the sample rack 30 (see FIG. 7**). However, it should be understood that the present application is not limited to the specific examples shown. For example, the shuttle may include two code reading portions respectively located on two opposite sides of the sample rack loading portion, and each of the two code reading portions may be provided with an identification code reading device. In this way, the two code reading portions can verify the accuracy of the identification by comparing the identification results, or can be used as redundant design for failures.

In the illustrated example, the identification code reading device of the shuttle 100 includes a code reader 110 and a mirror 120. The code reader 110 scans and reads the identification codes (e.g., barcodes) of the sample rack and the sample containers by reflection of the identification codes by the mirror 120. The reflection of the identification codes by the mirror 120 is indicated in the figures by the reference numeral 122. The identification code reading device in the illustrated example is an optical reading device. However, it should be understood that the identification code reading device may be any other devices capable of reading the identification codes of the sample rack and/or the sample containers known to those skilled in the art, for example, a device that reads the identification codes by feedback of an electrical signal.

The mirror 120 is proximate to one end, which is loaded first, of the sample rack 30 of the shuttle 100, which facilitates scanning and reading the identification code of the sample rack 30 and the identification codes of the sample containers 201 to 207 one by one during the process of the loading of the sample rack 30.

The notch 332 of the accommodating portion 33 of the sample rack 30 is located on a side facing the mirror, which facilitates reflecting, by the mirror 120, the identification code on the sample container 20 to the code reader 110 via the notch. The optical reading device includes a first optical path from the identification code of the sample rack and/or the identification code of the sample container to the mirror and a second optical path from the mirror to the code reader. The second optical path is substantially parallel to the longitudinal direction of the sample rack loading portion. The longitudinal direction of the sample rack loading portion is substantially in line with the longitudinal direction of the sample rack loaded on the sample rack loading portion, where multiple sample containers are arranged along the longitudinal direction of the sample rack.

Figure 5:
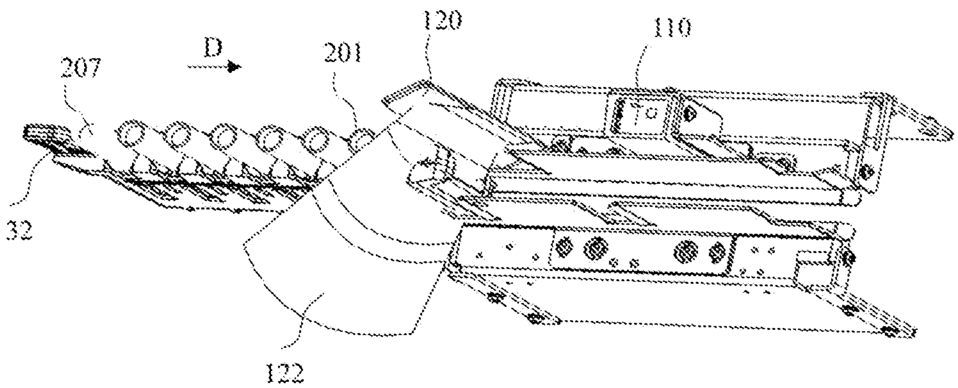
FIG. 5 is a schematic three-dimensional view of the code reader on the shuttle of FIG. 2 when reading identification code on a sample rack.

FIG. 5 illustrates a state of the shuttle 100 in which the identification code of the sample rack 30 is being read. As shown in FIG. 5, when the sample rack 30 is loaded onto the shuttle 100, the identification code located on the front end portion 34 of the sample rack 30 first arrives at a reading position of the identification code reading device. In this case, the code reader 110 first reads the identification code of the sample rack 30 by the reflection of the mirror 120.

As the sample rack 30 continues to be loaded onto the shuttle 100, a first sample container 201 arrives at the reading position of the code reader 110, as shown in FIGS. 2 to 4. In this case, the code reader 110 reads the identification code of the first sample container 201 by the reflection of the mirror 120.

Figure 6:
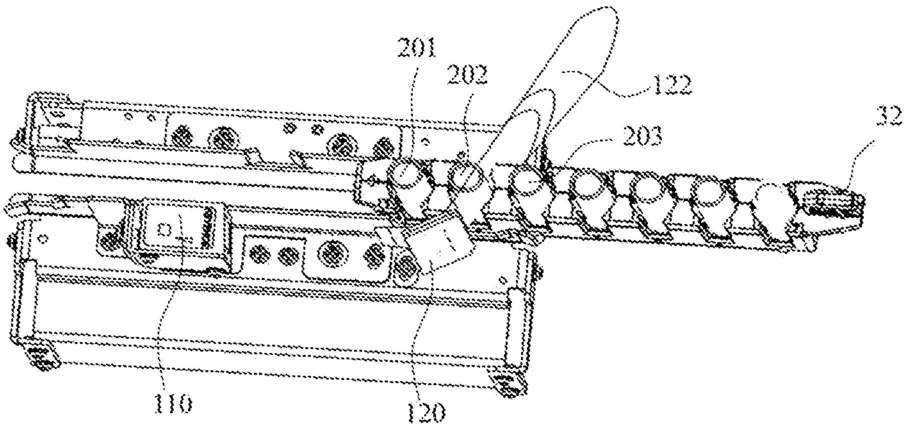
FIG. 6 is a schematic three-dimensional view of the code reader on the shuttle of FIG. 2 when reading identification code on a second sample container.

FIG. 6 illustrates that the code reader 110 is reading the identification code on a second sample container 202. In the example of FIG. 6, the second sample container 202 is located at a reflecting position of the mirror 120, i.e., arrives at the reading position of the code reader 110.

Figure 7:
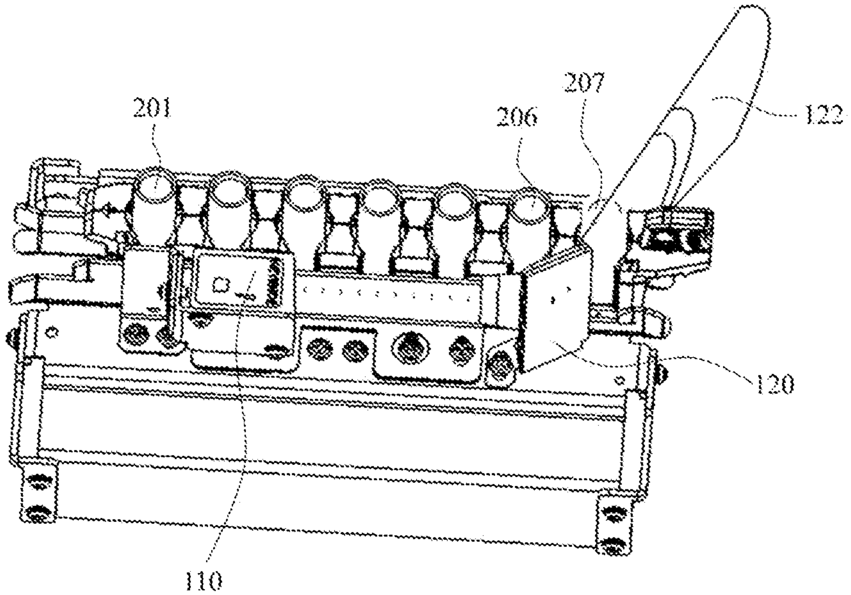
FIG. 7 is a schematic three-dimensional view of the code reader on the shuttle of FIG. 2 when reading identification code on a last sample container.

FIG. 7 illustrates that the code reader 110 is reading the identification code on a last sample container 207. In the example of FIG. 7, the last sample container 207 is located at the reflecting position of the mirror 120, i.e., arrives at the reading position of the code reader 110.

The shuttle 100 according to the present application may load the sample rack stepwise, to read the identification codes of the sample rack and the sample container. However, it should be understood that, alternatively, the shuttle 100 may load the sample rack continuously depending on the scanning or reading frequency of the code reader 110, the size (e.g., width) of the identification code, and the speed at which the sample rack is loaded.

Figure 8:
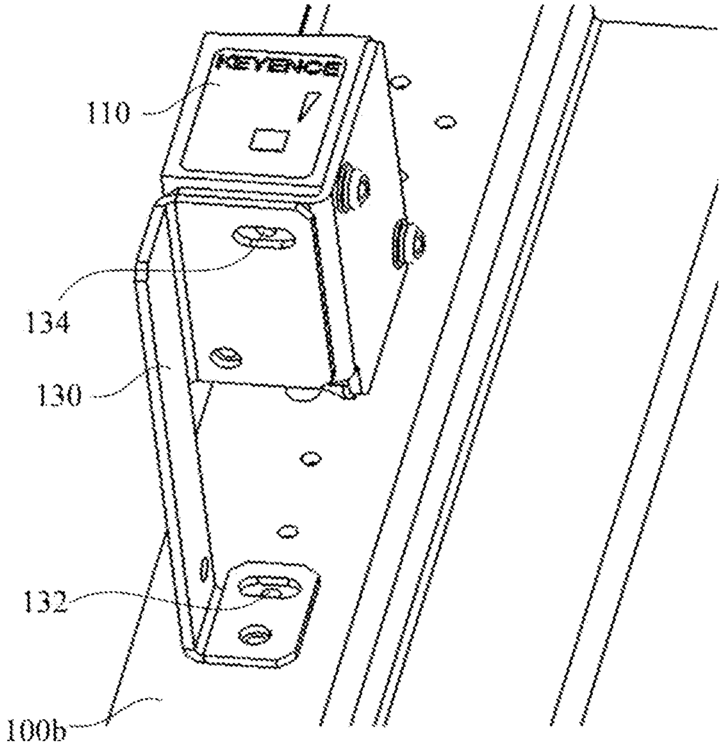
FIG. 8 is a schematic view of a code reader support member according to an embodiment of the present application.

FIG. 8 illustrates a code reader support member 130 for mounting and supporting the code reader 110. The code reader 110 is fixedly mounted to the code reader support member 130, and the code reader support member 130 is fixedly mounted to the code reading portion **100*b* of the shuttle 100. As shown in FIG. 8, the code reader support member 130 is provided with a mounting hole 132, and the code reader support member 130 is fixedly connected to the code reading portion 100*b* by inserting a fastener (not shown) into the mounting hole 132. Similarly, the code reader support member 130 is provided with a mounting hole 134, and the code reader 110 is fixedly connected to the code reader support member 130 by inserting a fastener (not shown) into the mounting hole 134**. It should be understood that the present application is not limited to the illustrated connection manner by means of the mounting hole and the fastener, but any suitable connection manners known in the art may be used.

Advantageously, the mounting position of the code reader support member 130 relative to the code reading portion **100*b* may be adjusted in at least one direction. As shown in FIG. 8, the mounting hole 132 may be an elongate hole to allow adjustment of the position of the code reader support member 130 relative to the code reading portion 100*b*. It should be understood that the code reader support member 130 may be adjustably mounted to the code reading portion 100*b*** in any suitable manner known in the art.

In addition, the mounting position of the code reader 110 relative to the code reader support member 130 may be adjusted in at least one direction. As shown in FIG. 8, the mounting hole 134 may be an elongate hole to allow adjustment of the position of the code reader 110 relative to the code reader support member 130. It should be understood that the code reader 110 may be adjustably mounted to the code reader support member 130 in any suitable manner known in the art.

Figure 9:
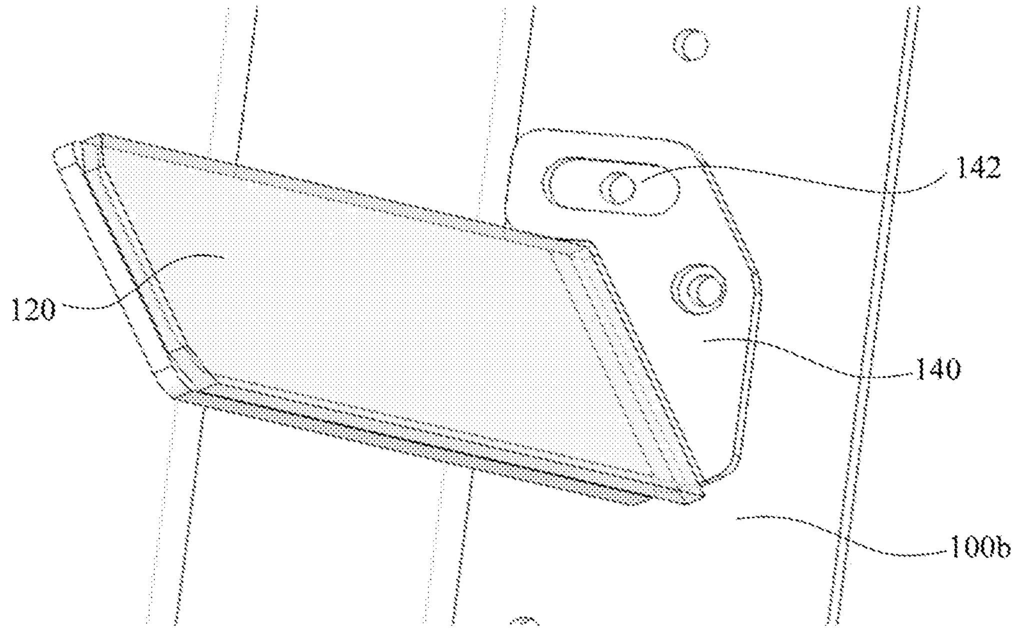
FIG. 9 is a schematic view of a mirror support member according to an embodiment of the present application.

FIG. 9 illustrates a mirror support member 140 for mounting and supporting the mirror 120. The mirror 120 is fixedly mounted to the mirror support member 140, and the mirror support member 140 is fixedly mounted to the code reading portion **100*b* of the shuttle 100. As shown in FIG. 9, the mirror support member 140 is provided with a mounting hole 142, and the mirror support member 140 is fixedly connected to the code reading portion 100*b* by inserting a fastener (not shown) into the mounting hole 142**. It should be understood that the present application is not limited to the illustrated connection manner by means of the mounting hole and the fastener, but any suitable connection manners known in the art may be used.

Advantageously, the mounting position of the mirror support member 140 relative to the code reading portion **100*b* may be adjusted in at least one direction. As shown in FIG. 9, the mounting hole 142 may be an elongate hole to allow adjustment of the position of the mirror support member 140 relative to the code reading portion 100*b*. It should be understood that the mirror support member 140 may be adjustably mounted to the code reading portion 100*b*** in any suitable manner known in the art.

Further, the mounting position of the mirror 120 relative to the mirror support member 140 may be adjusted in at least one direction in any suitable manner known in the art.

Although various embodiments and variations of the present application have been described in detail above, it should be understood by those skilled in the art that the present application is not limited to the specific embodiments and variations described above, but may include other various possible conjunctions and combinations. Other variations and modifications can be implemented by those skilled in the art without departing from the essence and scope of the present application. All the variations and modifications shall fall within the scope of the present application. Moreover, all the members described herein can be replaced by other technically equivalent members.

The invention claimed is:

1. A shuttle for a sample rack manipulation apparatus having a transfer area adjacent to a loading/unloading area, a sampling area and a buffer area, the shuttle comprising a first identification code reading device, wherein the shuttle is configured to convey a sample rack containing a sample container between the loading/unloading area, the sampling area and the buffer area by moving within the transfer area; and the first identification code reading device is fixed to, and moves with, the shuttle and is configured to read an identification code of the sample rack or an identification code of the sample container on the sample rack or both when the sample rack is loaded from the loading/unloading area onto the shuttle.

2. The shuttle according to claim 1, wherein the first identification code reading device is an optical reading device.

3. The shuttle according to claim 2, wherein the optical reading device comprises a code reader and a mirror, and the code reader is configured to read the identification code of the sample rack or the identification code of the sample container or both by reflection of the mirror on the identification code of the sample rack or the identification code of the sample container or both.

4. The shuttle according to claim 3, wherein the mirror is fixedly mounted to the shuttle.

5. The shuttle according to claim 3, wherein the mirror is adjustably mounted to the shuttle via a mirror support member.

6. The shuttle according to claim 3, wherein the code reader is adjustably mounted to the shuttle via a code reader support member.

7. The shuttle according to claim 1, wherein the shuttle includes a first end and the mirror is arranged at the first end.

8. The shuttle according to claim 7, wherein the first end of the shuttle is adjacent to the loading/unloading area.

9. The shuttle according to claim 3, wherein the shuttle further comprises a sample rack loading portion for carrying the sample rack and a first code reading portion for carrying the first identification code reading device wherein the sample rack loading portion includes a first side and a second side opposite to the first side;

the first code reading portion and the sample rack loading portion are arranged horizontally adjacent to each other; and the first code reading portion is arranged at the first side of the sample rack loading portion.

10. The shuttle according to claim 9, wherein the sample rack loading portion has a longitudinal direction substantially in line with a longitudinal direction of the sample rack loaded on the sample rack loading portion, and contains a plurality of sample containers are arranged along the longitudinal direction of the sample rack;

the optical reading device comprises a first optical path from the identification code of the sample rack or the identification code of the sample container or both to the mirror and a second optical path from the mirror to the code reader; and the second optical path is substantially parallel to the longitudinal direction of the sample rack loading portion.

11. The shuttle according to claim 9, wherein the shuttle further comprises a second code reading portion located on the second side of the sample rack loading portion, wherein the second code reading portion comprises a second identification code reading device.

12. The shuttle according to claim 1, wherein the first identification code reading device is configured to sequentially read the identification code of the sample rack and the identification code of the sample container on the sample rack when the sample rack is loaded stepwise or continuously.

13. A sample rack manipulation apparatus comprising the shuttle according to claim 1.

14. The sample rack manipulation apparatus according to claim 13, wherein the sample rack manipulation apparatus comprises a sample rack for holding sample containers, the sample rack comprises a plurality of accommodating portions for accommodating a plurality of sample containers, and each accommodating portion of the plurality of accommodating portions is arranged at a regular interval in a longitudinal direction.

15. The sample rack manipulation apparatus according to claim 13, wherein each accommodating portion of the plurality of accommodating portions comprises a corresponding notch for exposing an identification code of a sample container, and wherein the notch faces the first identification code reading device.

16. An automatic testing system comprising the sample rack manipulation apparatus according to claim 13.

17. The shuttle according to claim 3, wherein the first identification code reading device has exactly one code reader and exactly one mirror.

* * * * *